(12) United States Patent
Yu et al.

(10) Patent No.: US 8,861,892 B2
(45) Date of Patent: Oct. 14, 2014

(54) METHOD AND APPARATUS FOR DETERMINING PROJECTION AREA OF IMAGE

(71) Applicants: Haihua Yu, Beijing (CN); Hong Yi, Beijing (CN); Wei Wang, Beijing (CN)

(72) Inventors: Haihua Yu, Beijing (CN); Hong Yi, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 161 days.

(21) Appl. No.: 13/666,152

(22) Filed: Nov. 1, 2012

(65) Prior Publication Data

US 2013/0121601 A1    May 16, 2013

(30) Foreign Application Priority Data

Nov. 11, 2011   (CN) .......................... 2011 1 0358399

(51) Int. Cl.
*G06K 9/32* (2006.01)
*G06K 9/36* (2006.01)
*G06T 7/00* (2006.01)

(52) U.S. Cl.
CPC .......... *G06T 7/00* (2013.01); *G06T 2207/10152* (2013.01); *G06T 7/0042* (2013.01); *G06T 2207/20164* (2013.01); *G06T 2207/10016* (2013.01)
USPC ............................ 382/294; 382/286; 382/287

(58) Field of Classification Search
CPC ............ G06K 9/32; G06T 2207/10016; G06F 1/1639; G06F 1/1645; G06F 3/0425
USPC .......................................... 382/294, 286, 287
See application file for complete search history.

(56) References Cited

U.S. PATENT DOCUMENTS

| 7,171,056 | B2 |   | 1/2007 | Zhang et al. |
| 7,182,464 | B2 | * | 2/2007 | Ejiri et al. ........................ 353/69 |
| 7,517,089 | B2 | * | 4/2009 | Matsuda .......................... 353/69 |
| 7,661,827 | B2 | * | 2/2010 | Matsuda .......................... 353/69 |
| 7,872,637 | B2 | * | 1/2011 | Seeman et al. ................. 345/158 |
| 8,503,813 | B2 | * | 8/2013 | Sun et al. ....................... 382/260 |
| 8,731,299 | B2 | * | 5/2014 | Hawkins et al. .............. 382/181 |
| 2002/0149808 | A1 | * | 10/2002 | Pilu ............................... 358/530 |
| 2006/0181687 | A1 | * | 8/2006 | Matsuda .......................... 353/69 |

* cited by examiner

*Primary Examiner* — Utpal Shah
(74) *Attorney, Agent, or Firm* — Harness, Dickey & Pierce, P.L.C.

(57) ABSTRACT

A method and an apparatus for determining a projection area of an image are provided. The method for determining a projection area of an image, comprises: an input step of inputting an image sequence having a plurality of images; a detecting step of detecting locations of projection areas of the respective images in the image sequence; a relationship classification judging step of judging a relationship classification between the image and a previous image before the image being projected based on a relationship between the location of the projection area of the image and the location of the projection area of the previous image; and a determining step of determining the locations of the projection areas of the respective images based on the relationship classification judged in the relationship classification judging step.

10 Claims, 4 Drawing Sheets

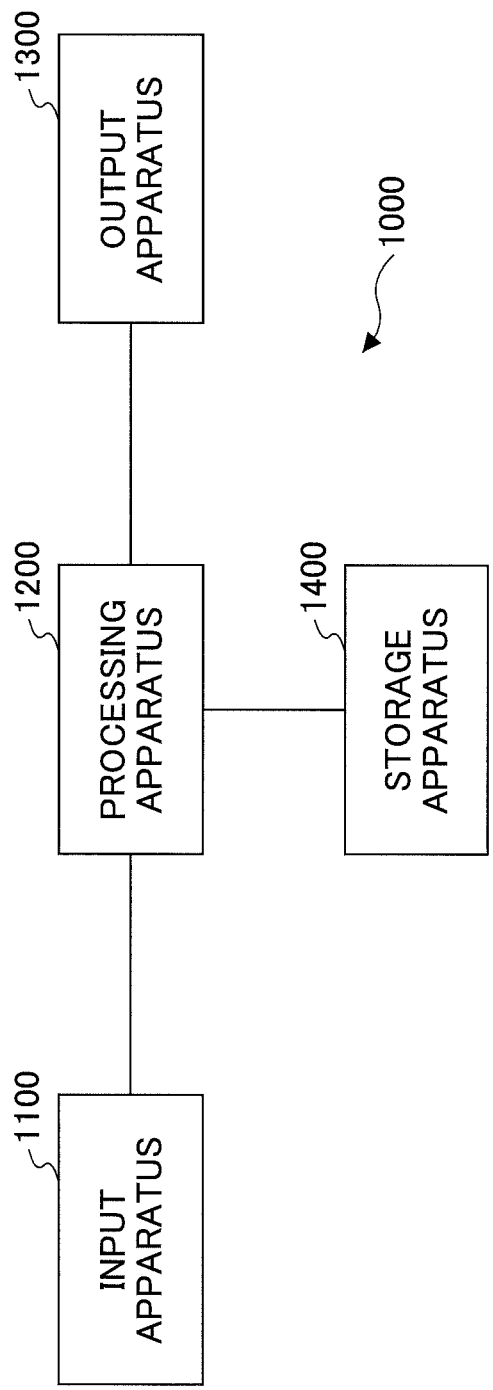

METHOD AND APPARATUS FOR DETERMINING PROJECTION AREA OF IMAGE

BACKGROUND OF THE INVENTION

1. Field of the Invention

The present invention relates to a method and an apparatus for determining a projection area of an image.

2. Description of the Related Art

As computer technology and network technology develop, remote applications such as remote conferencing, remote medicine, etc., are realized and develop rapidly. In this field, the prior art has made certain progress. In this kind application, an image captured by an image pickup apparatus user is transmitted to a remote pickup apparatus; however, the remote pickup apparatus is not always interested in the image captured by the image pickup apparatus, and in fact, the areas in which the remote pickup apparatus user is interested often appear deformed because of imaging angle. Therefore, in the remote applications, it is always considered how to capture the areas in which the remote pickup apparatus user is interested and correct the deformation of the areas of interest. Therefore, processing load is increased, especially when it is required to accommodate the need of real-time.

In the cited reference No. 1 (U.S. Pat. No. 7,171,056B2), a method for converting the content of a white board to an electronic document is disclosed. For this purpose, in the cited reference No. 1, a method for detecting a static white board area is provided. However, this method is used only to detect the static white board, not realize the detection for real-time continuous projection areas.

In the cited reference No. 2 (U.S. Pat. No. 7,872,637B2), a system for following the location of a laser point in a projection image of a computer screen, comprising a step of detecting the projection area, is disclosed. However, in the cited reference No. 2, only space information from a single frame image is used to detect the projection area, and the focus is on path tracking for the laser point by performing a time analysis for locations of laser points in continuous images. In this technology, the process is performed independently for each frame without using the result of detecting the projection area from a previous frame; therefore, it makes the process of system processing burden heavy.

In the projection-pickup system, four corner points of the projection area are detected to correct the coordinates of the system. In the prior art, only the projection area of a single static image is detected, without performing a real-time detection by performing a space analysis for continuous images of a video stream. Furthermore, in the prior art, the projection area is determined by analyzing the whole image area, therefore computational complexity is increased.

Furthermore, in one implementation process of the remote application such as the remote conference, the projection area does not always remain constant, but the projection area may change for various reasons. In the prior art, the single frame image is processed independently, so the need of real-time processing of continuous video images is not considered or the need of real-time is met by the method of performing processing independently of each frame; therefore, it makes the system processing burden heavy. In the field of the remote application, it is seriously limited by the transmission condition of network, etc., therefore the problem of the heavy system processing burden is more serious than that of the local application.

SUMMARY OF THE INVENTION

The present invention is made in light of the above problems, and may provide a method for determining the projection area of the image and an apparatus for determining the projection area of the image that detects and determines the projection of the image of a continuous video image sequence in real time by considering a change of scenes.

According to an aspect of the present invention, a method for determining a projection area of an image comprises: an input step of inputting an image sequence having a plurality of images; a detecting step of detecting locations of projection areas of the respective images in the image sequence; a relationship classification judging step of judging a relationship classification between an image being projected and a previous image before the image being projected based on a relationship between the location of the projection area of the image and the location of the projection area of the previous image; and a determining step of determining the locations of the projection areas of the respective images based on the relationship classification judged in the relationship classification judging step.

According to another aspect of the present invention, an apparatus for determining a projection area of an image comprises: an input unit for inputting an image sequence having a plurality of images; a detecting unit for detecting locations of projection areas of the respective images in the image sequence; a relationship classification judging unit for judging a relationship classification between an image being projected and a previous image before the image being projected based on a relationship between the location of the projection area of the image and the location of the projection area of the previous image; and a determining unit for determining the locations of the projection areas of the respective images based on the relationship classification judged by the relationship classification judging unit.

Other objects, features, advantages and industrial importance of the present invention will become more apparent from the following detailed description when read in conjunction with the accompanying drawings.

BRIEF DESCRIPTION OF THE DRAWINGS

FIG. 5 is an overall block diagram illustrating a system for determining the projection area of the image according to the embodiment of the present invention.

DETAILED DESCRIPTION OF THE PREFERRED EMBODIMENTS

In the following, embodiments of the present invention are described with reference to the accompanying drawings.

Figure 1:
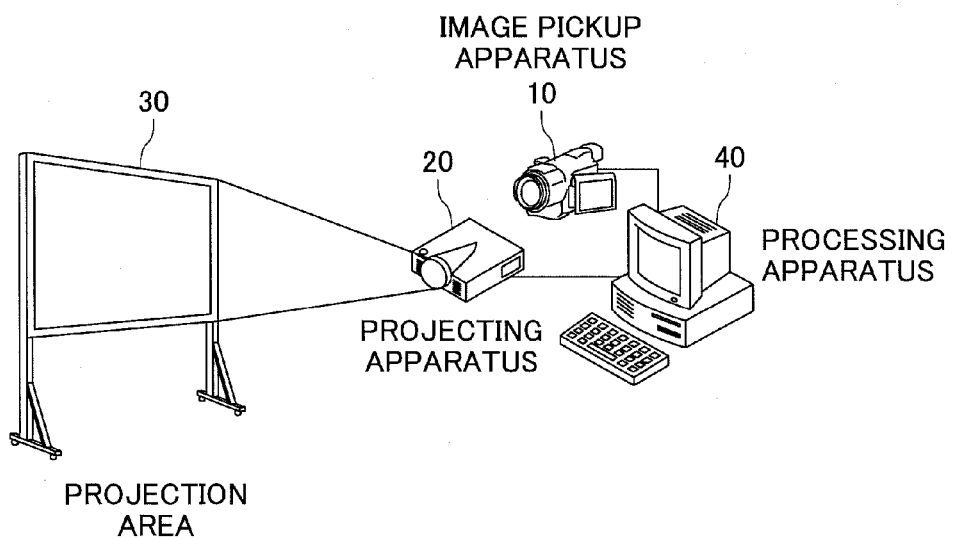
FIG. 1 is a schematic drawing illustrating the application environment of the method for determining the projection area of the image and the apparatus for determining the projection area of the image according to an embodiment of the present invention.

First, FIG. 1 is a schematic drawing illustrating the application environment of the method for determining the projection area of the image and the apparatus for determining the projection area of the image according to an embodiment of the present invention.

A projecting apparatus 20 projects the image on a projection screen 30. The content which the projection screen 30 displays is generally the content a local side presents to a remote side (not illustrated). The projection area on the projection screen 30 is generally considered as the area in which both of the local side and the remote side are interested. An image pickup apparatus 10 transmits picked-up video continuous images to a processing apparatus 40. The range to the image picked-up by the image pickup apparatus 10 is usually greater than the range to the projection area projected by the projecting apparatus 20; for example, it always includes a surrounding area of the projection screen without content and the surrounding environment such as wallpaper, desktops, etc., besides the area of interest displayed on the projection screen 30. The processing apparatus 40 may transmit the image to the remote side by any means. Obviously, the processing apparatus 40 may transmit the picked-up image directly to the remote side. However, such a transmitted image includes a lot of information for which the remote side does not have concern; therefore, not only is the transmission data volume too large, but also the real area of interest is weakened and the primary information may be ignored by the remote side.

Figure 2:
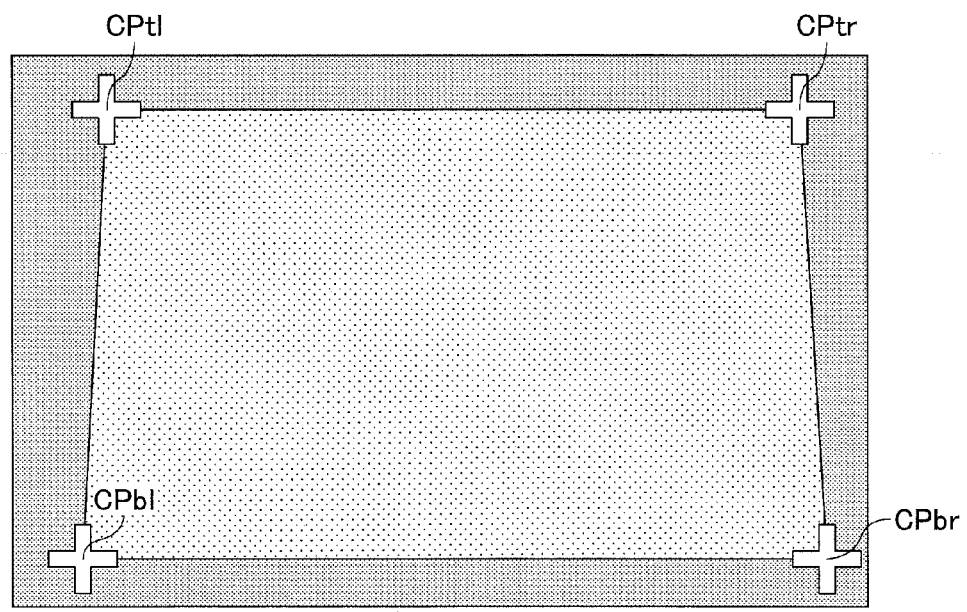
FIG. 2 is a diagram illustrating an example of the projection area of the picked-up image.

FIG. 2 is a diagram illustrating an example of the projection area of the picked-up image. In general, the picked-up image is greater than the projection area, even when the image pickup apparatus 10 is adjusted and aligned with the projection area as much as possible. Moreover, the projection area may be distorted and deformed somewhat in the picked-up image because of the shooting angle. Therefore, besides the above problems, the distorted image is inconvenient to watch for the remote side and the interaction between both sides is difficult, if the projection area is not detected.

Therefore, the processing apparatus 40 according to the method for determining the projection area of the image and the apparatus for determining the projection area of the image determines the projection area from continuous images comprising the projection areas provided by the image pickup apparatus 10. Thereby, it is convenient to realize the subsequent projection area in which the distortion is corrected, transmitting the content of the projection area, and the subsequent process such as interaction with the user who is writing content into the projection area or sharing the content of projection area with another remote system, etc. Therefore, determining the projection area is a foundation and prerequisite for the later correcting of the projection area and implementing the remote interaction and the sharing. The method for determining the projection area of the image and the apparatus for determining the projection area of the image according to the embodiment of the present invention regard the continuous video images obtained by the image pickup apparatus as an input, and determine the projection area of the image in real time as an output.

It should be noted that the projecting apparatus 20 may be, for example, a projector. The projection screen 30 may be an arbitrary screen such as a canvas screen, a white or black board, even a wall, as long as the projection screen 30 is a object that can display the image. The image pickup apparatus 10 may be an arbitrary apparatus for picking up an image, such as a camera, a video camera, a cinema camera, a webcam, etc. The processing apparatus 40 may be any type of computer or apparatus having a data processing ability.

Figure 3:
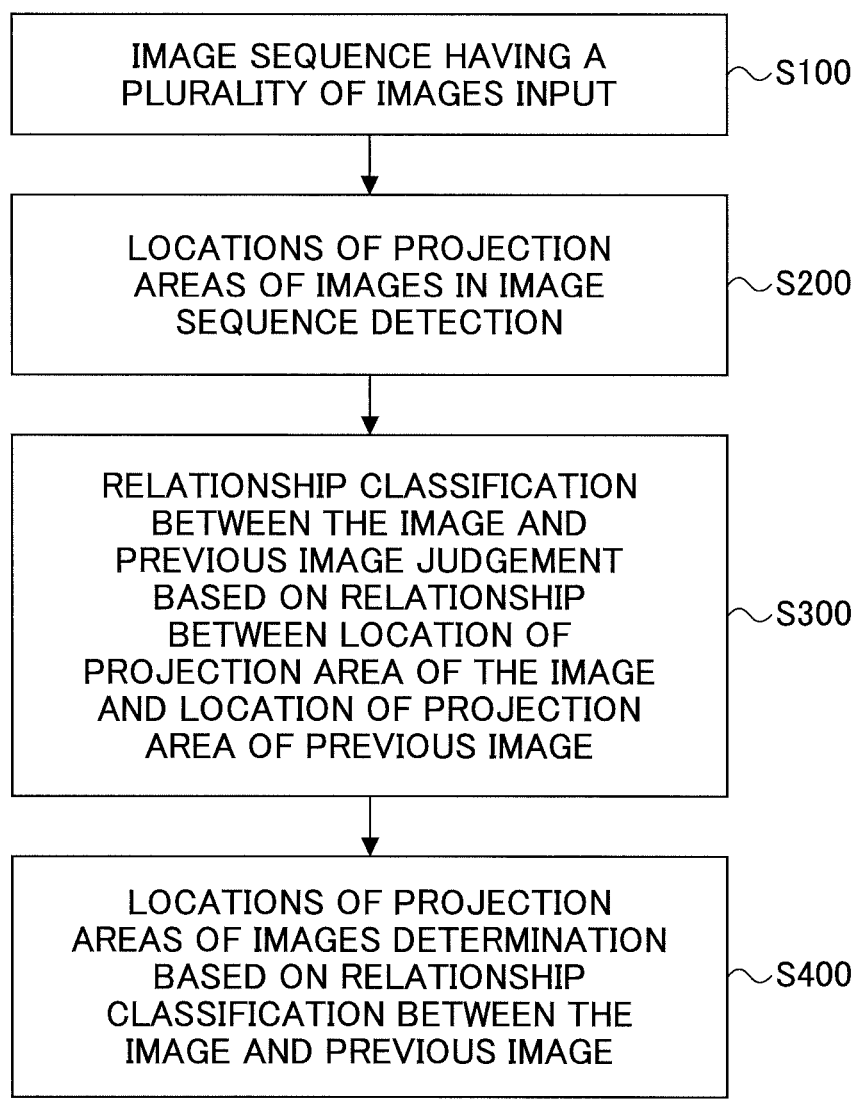
FIG. 3 is an overall flowchart illustrating the method for determining the projection area of the image according to the embodiment of the present invention.

FIG. 3 is an overall flowchart illustrating the method for determining the projection area of the image according to the embodiment of the present invention. As illustrated in FIG. 3, the method for determining the projection area of the image according to the embodiment of the present invention may comprise: an input step S100 of inputting an image sequence having a plurality of images; a detecting step S200 of detecting locations of projection areas of the respective images in the image sequence; a relationship classification judging step S300 of judging the relationship classification between the image and a previous image before the image being projected based on the relationship between the location of the projection area of the image and the location of the projection area of the previous image; and a determining step S400 of determining the locations of the projection areas of the respective images of the image sequence based on the relationship classification judged in the relationship classification judging step.

The image sequence input in the step S100 may be continuous video images captured by the image pickup apparatus 10, and the continuous video images are described as an input image sequence in the following. However, it should be noted that the embodiment of the present invention may obviously be applied to a static image having only a single frame. Each of the images ("frame images" or "frames") of the image sequence includes the projection area projected by the projecting apparatus 20. The projection area is a area in which both of the local side and the remote side are interested, being the foundation of the interaction between those two.

In the detecting step S200, the detected locations of four corner points of the quadrilateral of the projection area of the image represent the location of the projection area. For example, as illustrated in FIG. 2, the location of the projection area may be represented by the four corner points marked with the "+" symbol, namely, the top left corner point $CP_{tl}$, the top right corner point $CP_{tr}$, the bottom left corner point $CP_{bl}$, and the bottom right corner point $CP_{br}$.

In the detecting step S200, specifically, the location of the projection area of the image may be detected by the following process, in a manner that regards each of frames as an object one by one, respectively (single frame projection area detection):

(1) convert the color image into the grey scale image, when the frame image is a color image;

(2) reduce the noise of the image with a median filter;

(3) detect edges in images with a Canny operator (Canny edge detector);

(4) obtain a contour set of convex polygons from the detected edge point sequence;

(5) filter a quadrilateral contour that is similar to a square (i.e. a contour with four corners having angles that are similar to 90 degrees) from the contour set of the convex polygons;

(6) select the outermost quadrilateral as a candidate projection area, because the projection area always occupies the vast majority of the area of an input image.

All of the above steps of the detecting step S200 may be implemented by using the prior art. The detected projection area can be regarded as "the alternative" projection area, and be provided for a subsequent determining process.

In the detecting step S200, the detected projection area of the image does not constitute a quadrilateral or the projection area cannot be detected in the image for various reasons such as the projection area is hidden by an outside object (e.g., human body). The quadrilaterals that comply with the rule cannot be found by the edge detection and the contour searching method when the projection area is hidden, so that the searching result is null. According to the embodiment of the present invention, such a case may be regarded as a special classification of the location relationship of the projection areas between the current frame image and the previous frame image. The coping strategy for this classification will be described later on.

In the relationship classification judging step S300, the difference of the detection result between the current frame image and the previous frame image is judged by analyzing the space information, and the relationship between the current frame image and the previous frame image is classified based on the difference. The relationship classification represents the change of scenes between the previous frame and the current frame.

In the relationship classification judging step S300, a feature value of the projection area of the current single frame image is first calculated. The feature value of the projection area is defined as follows.

(1) Basic features for describing the projection area:

CP (corner point): for example, the corner points of the projection area of a two-dimensional image as illustrated in FIG. 2, namely, the top left corner point $CP_{tl}$, the top right corner point $CP_{tr}$, the bottom left corner point $CP_{bl}$, and the bottom right corner point $CP_{br}$, which are represented by the coordinate values (x,y) of the image coordinates.

PA (projection area): the quadrilateral constituted by the above four corner points, which is represented by PA ($CP_{tl}$, $CP_{tr}$, $CP_{bl}$, $CP_{br}$).

(2) Derivative features of the projection area, so that the feature values can be calculated based on the relationship of the corner points of two-dimensional space:

BL (border length): Euclidean distance between two adjacent corner points. For example, length of the top border between the top left corner point $CP_{tl}$ and the top right corner point $CP_{tr}$ may be calculated by the following calculation method:

$$BL(CP_{tl} \rightarrow CP_{tr}) = [(X_{tr}-X_{tl})^2 + (Y_{tr}-Y_{tl})^2]^{1/2}$$

Where the coordinates of the top left corner point $CP_{tl}$ are represented by ($X_{tl}$, $Y_{tl}$), the coordinates of the top right corner point $CP_{tr}$ are represented by ($X_{tr}$, $Y_{tr}$), and length of the top border is represented by $BL(CP_{tl} \rightarrow CP_{tr})$.

AR (aspect ratio): AR is a ratio of lengths of two borders (horizontal border divided by vertical border) intersecting at a special corner point. For example, the aspect ratio $AR_{tl}$ of the top left corner point $CP_{tl}$ may be represented by the following equation.

$$AR_{tl} = BL(CP_{tl} \rightarrow CP_{tr})/BL(CP_{tl} \rightarrow CP_{bl})$$

It should be noted that the derivative features of the projection area are not limited to those described above.

In the relationship classification judging step S300, it is judged that the relationship classification between the image and the previous image is a first classification in cases where a variation of a ratio of border lengths between the projection area of the image and the projection area of the previous image is greater than, or equal to or greater than a ratio difference threshold.

In the process of projection area detection according to the embodiment of the present invention, the projection area is sometimes hidden by an outside object (e.g., human body). In cases where a part of the projection area is hidden, the remainder of the projection may be still keep the shape of a basic quadrilateral, even though the aspect ratio of the projection area has changed a lot. In this case, the relationship between the current frame image and the previous frame image may be classified into the first classification.

The first classification of the previous/current frame image relationship may be caused by covering, namely, the projection area is hidden by the human body or other objects. The first classification may then be judged based on the variation of the border ratio.

Absolute values of differences of aspect ratio of two adjacent borders of corresponding corner points between the projection area of the image and the projection area of the previous image are calculated, respectively, and the sum of the absolute values of the differences is regarded as the variation of a ratio of border length.

For example, the variation of the ratio of border length of the corresponding corner points between the four corner points of the projection area of the detected current frame image and the four corner points of the projection area of the determined previous frame image may be calculated, respectively, and be compared with the ratio difference threshold.

Specifically, the absolute value of a difference $DAR_{tl}$ between the aspect ratio $AR_{tl}$ of the top left corner point of the projection area of the detected current image and the aspect ratio $AR'_{tl}$ of the top left corner point of the determined previous image is as shown in the following equation.

$$DAR_{tl} = |AR_{tl} - AR'_{tl}|$$

Similarly, the absolute value of differences $DAR_{tr}$, $DAR_{bl}$ and $DAR_{br}$ of the aspect ratio of the top right corner point, the bottom left corner point and the bottom right corner point between the projection area of the current image and the projection area of the previous image may be calculated.

Next, the sum of the four absolute values of the differences is regarded as the variation of ratio of border length according to the following equation (1).

$$VAR_{ar} = DAR_{tl} + DAR_{tr} + DAR_{bl} + DAR_{br} \qquad (1)$$

Next, it is determined whether the relationship of the projection area between the current image and the previous image is the above first classification or not, according to the following equation (2).

$$VAR_{ar} \geq T_{var\_ar} \qquad (2)$$

where $T_{var\_ar}$ is the ratio difference threshold of the corner point. If the equation (2) is met, the relationship between the current frame image and the previous frame image is classified as the first classification.

It should be noted that the condition of the equation (2) may be changed to $VAR_{ar} > T_{var\_ar}$. A proper ratio difference threshold may be obtained from experience. For example, in this case $T_{var\_ar}$ may be 0.1, 0.05 or 0.2, etc.

In addition, for convenience, it should be noted that the variation $VAR_{ar}$ of the ratio of border lengths may be calculated only from the differences of the aspect ratios of two corner points at the diagonal. For example, the variation of the ratio of border lengths may be obtained from the top left corner point and the bottom right corner point, according to the following equation (3).

$$VAR_{ar} = DAR_{tl} + DAR_{br} \qquad (3)$$

Similarly, the variation of the ratio of border lengths may be calculated from the top right corner point and the bottom left corner point at the other diagonal.

Additionally, the ratio difference threshold may be obtained accordingly from the experience in the same condition. For example, the ratio difference threshold of the equation (3) may be half of the ratio difference threshold of the equation (2). The ratio difference threshold may be used as the case of four corner points, where the average value of two absolute values of the differences is regarded as the variation of the ratio of border lengths.

In the relationship classification judging step S300, it is judged that the relationship classification between the image and the previous image is a second classification in cases where a variation of a ratio of border lengths between the projection area of the image and the projection area of the previous image is less than, or equal to or less than a ratio difference threshold and the number of the corner points for which the location of the corner point changes is greater than, or equal to or greater than a number threshold, and a variation of the locations of the corner points is greater than, or equal to or greater than a location difference threshold.

Specifically, in the process of determining the location relationship of the projection area between the current image and the previous image, the following variation is further judged, if the above equation (2) is not met but the result is $VAR_{ar} < T_{var\_ar}$, or the actual result is $VAR_{ar} \leq T_{var\_ar}$ in cases where the condition of the equation (2) is changed to $VAR_{ar} > T_{var\_ar}$.

$NUM_{cc}$: the number of the corner points for which the location coordinates of the corner point have changed;

$VAR_{cc}$: the variation of location between the corresponding corner points for which the location of the corner point has changed (namely, location difference. Unit: pixel).

Corresponding thresholds are set with respect to the above variation:

$T_{num\_cc}$: the number threshold with respect to the number of the corner points for which the location coordinates of the corner point have changed;

$T_{var\_cc}$: the location difference threshold with respect to the variation of the location of the corner points.

$T_{num\_cc}$ may be a value from experience, such as 2. Obviously, $T_{num\_cc}$ may also be 1 or 3, even 0 or 4.

The coordinates of the corresponding corner points of the images between the projection area of the current image and the projection area of the previous image, the number $NUM_{cc}$ of corner points for which the location has changed are counted. And then, it is determined whether the number $NUM_{cc}$ meets the following equation (4) or not.

$$NUM_{cc} \geq T_{num\_cc} \qquad (4)$$

It should be noted that the equation (4) may be changed to $NUM_{cc} > T_{num\_cc}$.

The variation of the location between the corresponding corner points may be calculated independently, while the number of the corner points for which the location thereof has changed are counted. Perhaps, the corner points for which the location thereof has changed may be determined first, the variation of the location between the corresponding corner points for which the location thereof has changed may be further calculated when the equation (4) or the variation thereof is met. Perhaps, the variation of the location between the corresponding corner points may be calculated firstly, the number of the corner points that the location thereof have changed is substituted in the equation (4) or the variation thereof to perform the determination, because it (the number of the corner points) is easily obtained.

For example, displacements of four corresponding corner points between the projection area of the (current) image and the projection area of the previous image are calculated, respectively, and the sum of the displacements of the four corresponding corner points is regarded as the variation of the locations of the corner points.

Specifically, the two-dimensional Euclidean distance $[(X_{tl} - X'_{tl})^2 + (Y_{tl} - Y'_{tl})^2]^{1/2}$ between the top left corner point $(X_{tl}, Y_{tl})$ of the projection area of the current frame image and the top left corner point $(X'_{tl}, Y'_{tl})$ of the determined projection area of the previous frame image may be calculated as the displacement of the top left corner point. Similarly, the two-dimensional Euclidean distance of the other three corresponding corner points may be calculated as the displacements thereof.

The sum of the displacements of four corresponding corner points is regarded as the variation $VAR_{cc}$ of the locations of the corner points. It is judged whether the variation $VAR_{cc}$ meets the following equation (5) or not.

$$VAR_{cc} > T_{var\_cc} \qquad (5)$$

where, $T_{var\_cc}$ is the location difference threshold that is a value from experience. In this case, $T_{var\_cc}$ may be 8; obviously, it may also be 5, 6, 10, etc. The unit of $T_{var\_cc}$ is pixels. Obviously, the equation (5) may be changed to $VAR_{cc} \geq T_{var\_cc}$.

Additionally, the average value of the displacements of the corresponding four corner points may also be regarded as the variation of the locations of the corner points. In this case, the location difference threshold of the equation (5) and the variation thereof may be divided by 4 accordingly.

Alternatively, horizontal displacements and vertical displacements of four corresponding corner points between the projection area of the (current) image and the projection area of the previous image are calculated, respectively, and the variation of the locations of the corner points is obtained by calculating the weighted sum of the horizontal displacements and the vertical displacements.

For example, the horizontal displacement $|X_{tl} - X'_{tl}|$ and the vertical displacement $|Y_{tl} - Y'_{tl}|$ of the top left corner point are calculated, where the top left corner point of the projection area of the detected current frame image is represented by $(X_{tl}, Y_{tl})$, and the top left corner point of the projection area of the determined previous frame image is represented by $(X'_{tl}, Y'_{tl})$. The horizontal displacement and the vertical displacement may be given different weights. For example, the horizontal displacement is given weight wh, and the vertical displacement is given weight wv, and the weighted sum wh $|X_{tl} - X'_{tl}| + $ wv $|Y_{tl} - Y'_{tl}|$ is calculated as the variation of the locations. Similarly, the horizontal displacements and the vertical displacements of the other three (top right, bottom left and bottom right) corner points are calculated, respectively, and the weighted sums are calculated as the variations of the respective locations. The sum or the average value of the variations of the locations of the four corner points respectively calculated is calculated as the variation of the corner point location $VAR_{cc}$. An experience value obtained by a same method is regarded as the corresponding location difference threshold $T_{var\_cc}$. $VAR_{cc}$ and $T_{var\_cc}$ are substituted in the equation (5) or the variation thereof to be compared.

Here, the weight wv of the vertical displacements may be greater than the weight wh of the horizontal displacements.

If it is not judged that the relationship belongs to the first classification, it may be determined that the relationship between the image and the previous image is the second classification in cases where the equation (4) or the variation thereof is met, and the equation (5) or the variation thereof is met.

The second classification of the projection area between the current image and the previous image may be caused by, for example, the shift of the projecting apparatus itself.

In the relationship classification judging step S300, it is judged that the relationship classification between the image and the previous image is a third classification in cases where a variation of the locations of the corner points is less than, or equal to or less than a location difference threshold.

Specifically, in the process of judging the location relationship of the projection area between the current image and the previous image, it may be determined that the relationship between the current image and the previous image is the third classification, if variance $VAR_{cc}$ of the locations of the corner points obtained by any of the above methods does not meet the above equation (5) but the result is $\text{VAR}_{cc} \leq T_{var\_cc}$, or the actual result is $\text{VAR}_{cc} < T_{var\_cc}$ in cases where the condition of the equation (5) is changed to $\text{VAR}_{cc} \geq T_{var\_cc}$.

The third classification of the projection area between the current image and the previous image may be caused by, for example, the interference of outside lights and shaking of the apparatuses themselves.

Furthermore, as described above, it is judged that the relationship classification between the image and the previous image is a fourth classification in the relationship classification judging step S300, in cases where the detected projection area of the image does not constitute a quadrilateral or the projection area cannot be detected in the image in the detecting step S200.

The fourth classification of the projection area between the current image and the previous image may be caused by, for example, other cases such as covering of the projecting apparatus or apparatus abnormality, etc.

After the relationship classification between the current frame image (also called "the current image" or "the image") and the previous frame image is judged based on the location of the projection area in the relationship classification judging step S300, the location of the projection area of the current frame image is determined based on the relationship classification in the determining step S400.

Specifically, in the determining step S400, the location of the projection area of the previous image is determined as the location of the projection area of the image when the relationship classification between the image and the previous image is the first classification.

In the determining step S400, the location of the projection area of the image detected in the detecting step S200 is determined as the location of the projection area of the image when the relationship classification between the image and the previous image is the second classification.

In the determining step S400, the location of the projection area of the previous image is determined as the location of the projection area of the image when the relationship classification between the image and the previous image is the third classification.

In the determining step S400, the location of the projection area of the previous image is determined as the location of the projection area of the image when the relationship classification between the image and the previous image is the fourth classification.

Therefore, only if the relationship classification between the image and the previous image is the second classification, the location of the projection area detected in the detecting step S200 may be determined as the location of the projection area of the image; namely, the determined location of the projection area of the previous frame image may be replaced. Except for this case, the determined location of the projection of the previous frame image may be used.

Namely, only if the relationship classification between the image and the previous image is the second classification, it is necessary to continue processes such as the process for correcting the distorted projection area. In other cases such as the first, third and fourth classification, etc., the processing load is reduced by using an existing result that corrects the distortion of the projection area.

Figure 4:
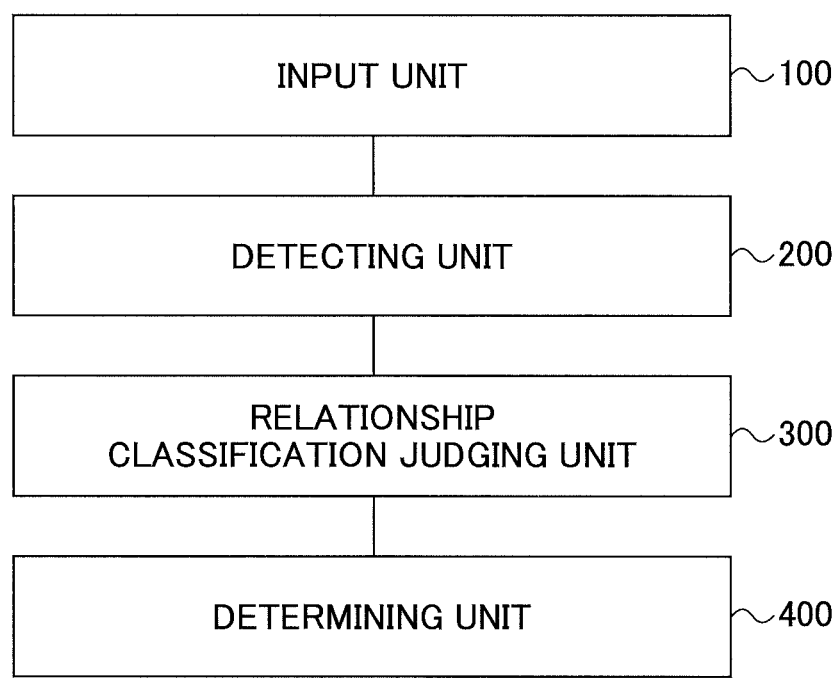
FIG. 4 is an overall block diagram illustrating the apparatus for determining the projection area of the image according to the embodiment of the present invention.

The present invention may also be implemented as the apparatus for determining the projection area of the image that can perform the above method for determining the projection area of the image according to the embodiment of the present invention. FIG. 4 is an overall block diagram illustrating the apparatus for determining the projection area of the image according to the embodiment of the present invention. As illustrated in FIG. 4, the apparatus for determining the projection area of the image according to the embodiment of the present invention may comprise an input unit 100 for performing the above inputting step S100 so as to input an image sequence having a plurality of images; a detecting unit 200 for performing the above detecting step S200 so as to detect locations of projection areas of the respective images in the image sequence; a relationship classification judging unit 300 for performing the above relationship classification judging step S300 so as to judge the relationship classification between the image and a previous image before the image being projected based on the relationship between the location of the projection area of the image and the location of the projection area of the previous image; and a determining unit 400 for performing the above determining step S400 so as to determine the locations of the projection areas of the respective images based on the relationship classification judged by the relationship classification judging unit.

In the detecting unit 200, the detected locations of four corner points of the quadrilateral of the projection area of the image may represent the location of the projection area.

The relationship classification judging unit 300 may judge that the relationship classification between the image and the previous image is a first classification in cases where a variation of a ratio of border lengths between the projection area of the (current) image and the projection area of the previous image is greater than, or equal to or greater than a ratio difference threshold.

The relationship classification judging unit 300 may judge that the relationship classification between the image and the previous image is a second classification in cases where a variation of the ratio of border lengths between the projection area of the (current) image and the projection area of the previous image is less than, or equal to or less than a ratio difference threshold and the number of the corner points in which the location of the corner point changes is greater than, or equal to or greater than a number threshold, and a variation of the locations of the corner points is greater than, or equal to or greater than a location difference threshold.

Preferably, the relationship classification judging unit 300 may calculate absolute values of differences of aspect ratios of two adjacent borders of corresponding corner points between the projection area of the image and the projection area of the previous image, respectively, and regard the sum of the absolute values of the differences as the variation of the ratio of border lengths.

The relationship classification judging unit 300 may judge that the relationship classification between the (current) image and the previous image is a third classification in cases where a variation of the locations of the corner points is less than, or equal to or less than a location difference threshold.

Preferably, the relationship classification judging unit 300 may calculate displacements of four corresponding corner points between the projection area of the image and the projection area of the previous image, respectively, and regard the sum of the displacements of the four corresponding corner points as the variation of the locations of the corner points.

Alternatively, the relationship classification judging unit 300 may calculate horizontal displacements and vertical displacements of four corresponding corner points between the projection area of the image and the projection area of the previous image, respectively, and obtain the variation of the locations of the corner points by calculating the weighted sum of the horizontal displacements and the vertical displacements.

Furthermore, the relationship classification judging unit 300 may judge that the relationship classification between the image and the previous image is a fourth classification in cases where the detected projection area of the image does not constitute a quadrilateral or the projection area cannot be detected in the image by the detecting unit 200.

The determining unit 400 may determine the location of the projection area of the previous image as the location of the projection area of the image when the relationship classification between the image and the previous image is the first classification.

The determining unit 400 may determine the location of the projection area of the image detected in the detecting step as the location of the projection area of the image when the relationship classification between the image and the previous image is the second classification.

The determining unit 400 may determine the location of the projection area of the previous image as the location of the projection area of the image when the relationship classification between the image and the previous image is the third classification.

The determining unit 400 may determine the location of the projection area of the previous image as the location of the projection area of the image when the relationship classification between the image and the previous image is the fourth classification.

The present invention may be implemented as a system for determining the projection area of the image. It should be noted that the method, apparatus and system for determining the projection area of the image according to the embodiment of the present invention may be applied only to one side such as the local side without depending on whether the remote side exists or not, even though the embodiment of the present invention may be applied in the remote system. The embodiment of the present invention may be merely used to determine the projection for bringing convenience to the subsequent process. It should be noted that the determined projection area may be used by any way, even though a further correction of the distorted area may not be performed or the content of the projection area may not be transmitted to the remote side.

FIG. 5 is an overall flowchart illustrating a system 1000 for determining the projection area of the image according to the embodiment of the present invention. The system 1000 for determining the projection area of the image may comprise an input apparatus 1100, for example, including the above image pickup apparatus 10, etc.; a processing apparatus 1200 for implementing the above method for determining the projection area of the image according to the embodiment of the present invention or being implemented as the above apparatus for determining the projection area of the image according to the embodiment of the present invention, such as CPU of a computer or other chips having processing ability, etc.; an output apparatus 1300 for outputting the process of determining the projection area of the image and the result obtained by the subsequent process thereof to the outside, such as an apparatus including a screen, a printer, a communication network and a remote output device connected thereto, etc.; and a storage apparatus 1400 for storing a program for performing the process of determining the projection area, relevant images, the obtained results, command and intermediate data, etc., by a volatile method or a nonvolatile method, such as various kinds of volatile or nonvolatile memory including a RAM, a ROM, a harddisk and a semiconductor memory.

In the embodiment of the present invention, a continuous image sequence is regarded as the object processing data, and a space analysis between adjacent frame images is performed based on various kinds of feature values of the projection area, so as to determine the projection area of the current image. The method, apparatus and system for determining the projection area of the image according to the embodiment of the present invention have flexibility to adapt the variation of conditions and distinguish different scenes, for example, shift of the image pickup apparatus or projecting apparatus, covering of the projection area from the human body, image flicker caused by the variation of the outside light and image shaking caused by vibration of the apparatus itself.

According to the embodiment of the present invention, determination of the projection area of each of frame images based on the inputted continuous images can be realized, and the space analysis is performed in real time based on the detection result of the adjacent frame images. Therefore, different processing strategies can be applied based on the scene variation between the previous frame image and the current frame image, for example, the determination result of the projection area of the previous frame image may be applied directly in some cases of scene variation, and the detection result of the projection area of the current frame image does not have to be applied, so as to reduce the processing workload as much as possible. The processing load is reduced by using the previously determined projection area and avoiding the need to correct the distorted projection area again.

The sequence of operations described above may be implemented by hardware, software, or a combination of hardware and software. If the sequence of operations is implemented by software, the computer programs of the operations may be installed in a built-in memory in specialized hardware, thereby causing a computer to execute the installed computer programs. Such computer programs may also be installed in a general-purpose computer capable of performing various processes, thereby causing the general-purpose computer to execute the installed computer programs.

For example, such computer programs may be stored in a recording medium such as hardware or ROM in advance, or may be temporarily or permanently stored in a removable recording medium such as a FD, a CD-ROM, a MO (magneto-optical) disk, a DVD, a magnetic disk, and semiconductor memory. Such removable recording media storing the programs may be provided as package software.

The present invention is not limited to the specifically disclosed embodiments, and variations and modifications may be made without departing from the scope of the present invention.

The present application is based on Chinese Priority Application No. 201110358399.7 filed on Nov. 11, 2011, the entire contents of which are hereby incorporated herein by reference.

What is claimed is:

1. A method for determining a projection area of an image, comprising:

an input step of inputting an image sequence having a plurality of images;

a detecting step of detecting locations of projection areas of the respective of images in the image sequence;

a relationship classification judging step of judging a relationship classification between an image being projected and a previous image before the image being projected based on a relationship between the location of the projection area of the image and the location of the projection area of the previous image; and a determining step of determining the locations of the projection areas of the respective images based on the relationship classification judged in the relationship classification judging step.

2. The method for determining a projection area of an image according to claim 1, wherein
in the detecting step, the detected locations of four corner points of a quadrilateral of the projection area of the image represent the location of the projection area.

3. The method for determining a projection area of an image according to claim 2, wherein
in the relationship classification judging step, it is judged that the relationship classification between the image and the previous image is a first classification in cases where a variation of a ratio of border lengths between the projection area of the image and the projection area of the previous image is greater than, or equal to or greater than a ratio difference threshold, and
in the determining step, the location of the projection area of the previous image is determined as the location of the projection area of the image when the relationship classification between the image and the previous image is the first classification.

4. The method for determining a projection area of an image according to claim 2, wherein
in the relationship classification judging step, it is judged that the relationship classification between the image and the previous image is a second classification in cases where a variation of a ratio of border lengths between the projection area of the image and the projection area of the previous image is less than, or equal to or less than a ratio difference threshold and the number of the corner points for which the location of the corner point changes is greater than, or equal to or greater than a number threshold, and a variation of the locations of the corner points is greater than, or equal to or greater than a location difference threshold, and
in the determining step, the location of the projection area of the image detected in the detecting step is determined as the location of the projection area of the image when the relationship classification between the image and the previous image is the second classification.

5. The method for determining a projection area of an image according to claim 2, wherein
in the relationship classification judging step, it is judged that the relationship classification between the image and the previous image is a third classification in cases where a variation of the locations of the corner points is less than, or equal to or less than a location difference threshold, and
in the determining step, the location of the projection area of the previous image is determined as the location of the projection area of the image when the relationship classification between the image and the previous image is the third classification.

6. The method for determining a projection area of an image according to claim 1, wherein
in the relationship classification judging step, it is judged that the relationship classification between the image and the previous image is a fourth classification in cases where the detected projection area of the image does not constitute a quadrilateral or the projection area cannot be detected in the image in the detecting step; and
in the determining step, the location of the projection area of the previous image is determined as the location of the projection area of the image when the relationship classification between the image and the previous image is the fourth classification.

7. The method for determining a projection area of an image according to claim 4, wherein
displacements of four corresponding corner points between the projection area of the image and the projection area of the previous image are respectively calculated, and the sum of the displacements of four corresponding corner points is regarded as the variation of the locations of the corner points.

8. The method for determining a projection area of an image according to claim 4, wherein
horizontal displacements and vertical displacements of four corresponding corner points between the projection area of the image and the projection area of the previous image are respectively calculated, and the variation of the locations of the corner points is obtained by calculating the weighted sum of the horizontal displacements and the vertical displacements.

9. The method for determining a projection area of an image according to claim 3, wherein
absolute values of differences of aspect ratios of two adjacent borders of corresponding corner points between the projection area of the image and the projection area of the previous image are respectively calculated, and the sum of the absolute values of the differences is regarded as the variation of the ratio of border lengths.

10. An apparatus for determining a projection area of an image, comprising:
an input unit for inputting an image sequence having a plurality of images;
a detecting unit for detecting locations of projection areas of the respective images in the image sequence;
a relationship classification judging unit for judging a relationship classification between an image being projected and a previous image before the image being projected based on a relationship between the location of the projection area of the image and the location of the projection area of the previous image; and
a determining unit for determining the locations of the projection areas of the respective images based on the relationship classification judged by the relationship classification judging unit.

* * * * *